United States Patent [19]

Heap et al.

[11] 3,813,759

[45] June 4, 1974

[54] METHOD OF BRAZING

[75] Inventors: Harry Rodney Heap; Colin Charles Riley, both of Stafford, England

[73] Assignee: English Electric Company Limited, London, England

[22] Filed: Sept. 9, 1971

[21] Appl. No.: 179,192

[52] U.S. Cl............................. 29/472.7, 29/473.1
[51] Int. Cl............................................ B23k 31/02
[58] Field of Search............... 29/472.7, 473.1, 504; 287/189–365

[56] References Cited
UNITED STATES PATENTS

| | | | |
|---|---|---|---|
| 2,093,390 | 9/1937 | Wyckoff...................... | 29/472.7 UX |
| 3,091,028 | 5/1963 | Westbrook et al............ | 29/473.1 |
| 3,196,536 | 7/1965 | Knippenberg et al......... | 29/427.7 |
| 3,399,076 | 8/1968 | Ginsberg et al.............. | 29/473.1 X |
| 3,425,116 | 2/1969 | Crooks et al................. | 29/427.7 |
| 3,439,858 | 4/1969 | Ando et al.................... | 29/472.7 X |
| 3,609,856 | 10/1971 | Eckert.......................... | 29/473.1 |
| 3,654,694 | 4/1972 | Dunlop......................... | 29/504 X |
| 3,678,568 | 7/1972 | Knippenberg et al......... | 29/473.1 |

OTHER PUBLICATIONS

Donnelly, R. G. et al., "The Brazing of Graphite," Welding Journal, May, 1962, pp. 461–469.

Primary Examiner—J. Spencer Overholser
Assistant Examiner—Ronald J. Shore
Attorney, Agent, or Firm—Kirschstein, Kirschstein, Ottinger & Frank

[57] ABSTRACT

A method of brazing together bodies composed either of dense self-bonded silicon carbide containing free silicon or dense carbon using a brazing material consisting of an alloy of silicon with one or more metals, in particular germanium, iron, gold, nickel, palladium, platinum, chromium, titanium, which alloy contains at least 5 atomic per cent of silicon, has a melting temperature not higher than 1400°C, has thermal expansion characteristics matching those of the bodies to be brazed together, and in the molten state is capable of wetting the surfaces of the bodies. The method is especially suitable for bracing silicon carbide caps to silicon carbide nuclear fuel element containers.

13 Claims, No Drawings

METHOD OF BRAZING

This invention relates to a method of brazing together two bodies each composed either of silicon carbide, more particularly so-called "structural" silicon carbide which consists of dense self-bonded silicon carbide containing free silicon, or of dense carbon.

It has been proposed that bodies of pure silicon carbide containing no free silicon, such as the type used in semiconductor devices, may be brazed together by means of alloys of iron, tantalum and nickel, and that dense carbon, which behaves in a similar way to silicon carbide, may be brazed by means of gold-nickel and nickel-chromium-palladium alloys. Furthermore, it has been proposed that metallic contacts may be brazed to silicon carbide semiconductor elements using silicon-germanium alloys, silicon-iron alloys at a brazing temperature of 1,400° to 1,800°C, and gold-tantalum-silicon alloys.

however, the brazes formed by means of the above-mentioned alloys do not meet the requirements, for example, for brazing a silicon carbide cap to a silicon carbide nuclear fuel element container, where the silicon carbide contains free silicon, and wherein it is essential that the braze is completely vacuum tight and has a high mechanical strength at elevated temperatures. It is an object of the present invention to provide an improved brazing method which is capable of meeting these requirements.

We have found that a braze meeting the abovementioned mechanical requirements may be effected, between bodies of silicon carbide containing free silicon, by means of any alloy of silicon which melts at a temperature below the melting point of silicon (1,420°C). This limitation on the melting temperature of the braze alloy is necessary since if the alloy had a melting temperature above that of silicon, so that the braze could only be formed at a temperature above the melting point of silicon, the free silicon included in the silicon carbide would melt during the brazing process, giving rise to leaks and distortion in the brazed joint or in the silicon carbide body. It will be appreciated that in this respect the properties of silicon carbide containing free silicon are different from those of the pure silicon carbide used in semiconductor devices. We have also found that similar alloys of silicon can be employed for forming satisfactory brazes between bodies of dense carbon, and between free silicon-containing silicon carbide and dense carbon.

Thus according to the invention, in a method of brazing together two bodies each composed either of dense self-bonded silicon carbide containing free silicon, or of dense carbon, the braze material employed consists of an alloy of silicon with one or more metals, which alloy contains at least 5 atomic percent of silicon, has a melting temperature not higher than 1,400°C, has thermal expansion characteristics matching those of silicon carbide and/or dense carbon, and in the molten state is capable of wetting the surface of silicon carbide and/or dense carbon.

It is to be understood that the term "dense," as used herein with reference to carbon, means that the carbon is of a type which is substantially impermeable to gases. Such carbon can be produced, for example, by the controlled pyrolysis of certain organic materials.

It will be appreciated that the braze alloy employed should have thermal expansion characteristics matching those of the material of the bodies to be brazed together, so as to minimise the possibility of cracking occurring in the brazed joint due to thermal stresses in use.

Preferably the braze material is an alloy of silicon with at least one of the metals germanium, iron, gold, nickel, palladium, platinum, chromium, titanium. One preferred class of braze materials for use in accordance with the invention consists of germanium-silicon alloys containing at least 80 percent by weight of germanium, the balance being silicon. Another preferred class of braze materials consists of alloys of silicon with chromium or titanium, alone or with additions of up to 10 percent by weight of either nickel or germanium, the preferred proportions of nickel or germanium being 5 percent by weight: the additions of nickel or germanium slightly reduce the melting temperatures of the silicon-chromium and silicon-titanium alloys.

The workpiece surfaces to be brazed together are prepared by machining to a desired shape, if necessary, and cleaning by conventional methods. The braze alloys are used in the form of foil if possible, but if the alloy is too brittle to be rolled to foil it is used in the form of powder, preferably fine enough to pass through a 200 mesh B.S.S. sieve. The brazing process is carried out in vacuum or in a gas atmosphere which does not oxidise carbon or otherwise react with the material of the workpieces or with the braze alloy.

Some specific methods, in accordance with the invention, which we have employed for brazing silicon carbide bodies together, will now be described in the following examples.

Example 1

Germanium-silicon alloys were used under various conditions for brazing together two bodies of dense silicon carbide containing up to 10 percent by weight of free silicon, the brazing in each case being carried out in vacuum. Firstly, the brazing was effected with an alloy consisting of 90 percent germanium and 10 percent silicon, by weight, over a period of 1 hour at a temperature of 1,220°C, and the resulting brazed joint was found to be capable of withstanding tensile stresses up to 340 pounds per square inch before fracturing. The strength of the brazed joint, as indicated by the fracture stress, increased with increasing brazing time and temperature, and also with increasing silicon content of the braze alloy: thus on increasing the brazing time to 16 hours, using the 90 percent Ge-10 percent Si alloy and a temperature of 1,220°C, the fracture stress was increased to 450 p.s.i., whilst on increasing the brazing temperature for the 16 hour period to 1,320°C the fracture stress was raised to 1,800 p.s.i. Fracture stresses in excess of 1,800 p.s.i. were obtained when using a braze alloy consisting of 80 percent germanium and 20 percent silicon, by weight, over a period of 16 hours at 1,320°C. The joint strength is mainly attributable to braze fillets, as the alloy initially in the centre of the joint diffuses into the silicon carbide during the brazing process.

Example 2

An alloy consisting of 65 percent nickel and 35 percent silicon, by weight, was used for brazing together silicon carbide bodies similar to those referred to in Example 1, the brazing being carried out at a temperature of 1,120°C over a period of 16 hours, giving brazed joints whose tensile fracture stress was 375 p.s.i.

Example 3

Brazed joints were formed between silicon carbide bodies using an alloy consisting of 45 percent iron and 55 silicon, by weight, at brazing temperatures of 1,220°C and 1,320°C, over periods of 1 hour and 16 hours giving brazed joints whose tensile fracture stress was in the range of 300 to 400 p.s.i.

Example 4

Brazed joints were formed between silicon carbide bodies using an alloy consisting of 75 percent silicon and 25 percent chromium, by weight, the brazing being carried out at a temperature of 1,355°C over periods of 1 and 2 hours giving joints whose tensile fracture stress was in excess of 1,800 p.s.i.

Example 5

Brazed joints were formed between silicon carbide bodies using an alloy consisting of 78 percent silicon and 22 percent titanium, by weight, the brazing being carried out at 1,355°C over periods of 1 and 2 hours giving joints whose tensile fracture stress was in excess of 1,800 p.s.i.

Example 6

Brazed joints were formed between silicon carbide bodies, over periods of 1 and 2 hours at a temperature of 1,320°C, with the following ternary alloys:
a. 72.5 percent silicon, 22.5 percent chromium, 5 percent nickel;
b. 75.5 percent silicon, 19.5 percent titanium, 5 percent nickel;
c. 72.5 percent silicon, 22.5 percent chromium, 5 percent germanium;
d. 75.5 percent silicon, 19.5 percent titanium, 5 percent germanium,
all the alloy compositions being in percentages by weight. The brazed joints formed by all of these alloys, under the conditions stated, had tensile fracture stresses in excess of 1,800 p.s.i.

It is to be understood that the silicon carbide bodies referred to in Examples 3 to 6 were all of similar composition to those mentioned in Example 1, and that all the brazing processes described in the Examples were carried out in vacuum. The brazing can alternatively be carried out in high purity argon.

All the brazing alloys referred to in the above specific Examples also formed satisfactory brazed joints between bodies of dense carbon, and between a body of dense carbon and a body of dense silicon carbide containing free silicon.

We claim:

1. A method of brazing together two bodies each composed of dense self-bonded silicon carbide containing free silicon, which method includes the steps of cleaning those surfaces of the bodies which are to be brazed together and of bringing the surfaces in proximity, that improvement constituting using as a braze material alloy of silicon with at least one metal, which alloy contains at least 5 atomic percent of silicon, has a melting temperature not higher than 1,400°C, has thermal expansion characteristics matching those of the said silicon carbide, and in the molten state is capable of wetting the surface of the said silicon carbide, and heating said bodies and said braze material in an atmosphere which is non-reactive with the silicon carbide and with the braze alloy, at a temperature sufficiently high to melt said alloy but not higher than 1,400°C, for a period of at least one hour.

2. A method according to claim 1, wherein the said braze material consists of an alloy of silicon with at least one of the metals of the group consisting of germanium, iron, gold, nickel, palladium, platinum, chromium, titanium, and wherein the said heating step is carried out in vacuum and at a temperature in the range of 1,120°C to 1,355°C for a period of 1 to 16 hours.

3. A method according to claim 2, wherein the said braze material consists of a germanium-silicon alloy containing at least 80 percent by weight of germanium, the balance being silicon.

4. A method according to claim 2, wherein the said braze material consists of an alloy of 65 percent nickel and 35 percent silicon, by weight.

5. A method according to claim 2, wherein the said braze material consists of an alloy of 45 percent iron and 55 percent silicon, by weight.

6. A method according to claim 2, wherein the said braze material consists of an alloy of 25 percent chromium and 75 percent silicon, by weight.

7. A method according to claim 2, wherein the said braze material consists of an alloy of 22 percent titanium and 78 percent silicon, by weight.

8. A method according to claim 1, wherein the said braze material consists of an alloy of silicon with a metal of the group consisting of chromium and titanium, together with up to 10 percent by weight of a metal of the group consisting of nickel and germanium, and wherein the said heating step is carried out in vacuum and at a temperature in the range of 1,120°C to 1,355°C for a period of 1 to 16 hours.

9. A method according to claim 8, wherein the proportion of the metal of the group consisting of nickel and germanium in the said alloy is 5 percent by weight.

10. A method according to claim 9, wherein the said braze material consists of an alloy of 5 percent nickel, 25.5 percent chromium and 72.5 percent silicon, by weight.

11. A method according to claim 9, wherein the said braze material consists of an alloy of 5 percent nickel, 19.5 percent titanium and 75.5 percent silicon, by weight.

12. A method according to claim 9, wherein the said braze material consists of an alloy of 5 percent germanium, 22.5 percent chromium and 72.5 percent silicon, by weight.

13. A method according to claim 9, wherein the said braze material consists of an alloy of 5 percent germanium, 19.5 percent titanium and 75.5 percent silicon, by weight.

* * * * *